Oct. 29, 1968 R. T. STAUNTON 3,408,438
METHOD OF MAKING SELF-SUPPORTING FILTER ELEMENT
Original Filed Feb. 5, 1964
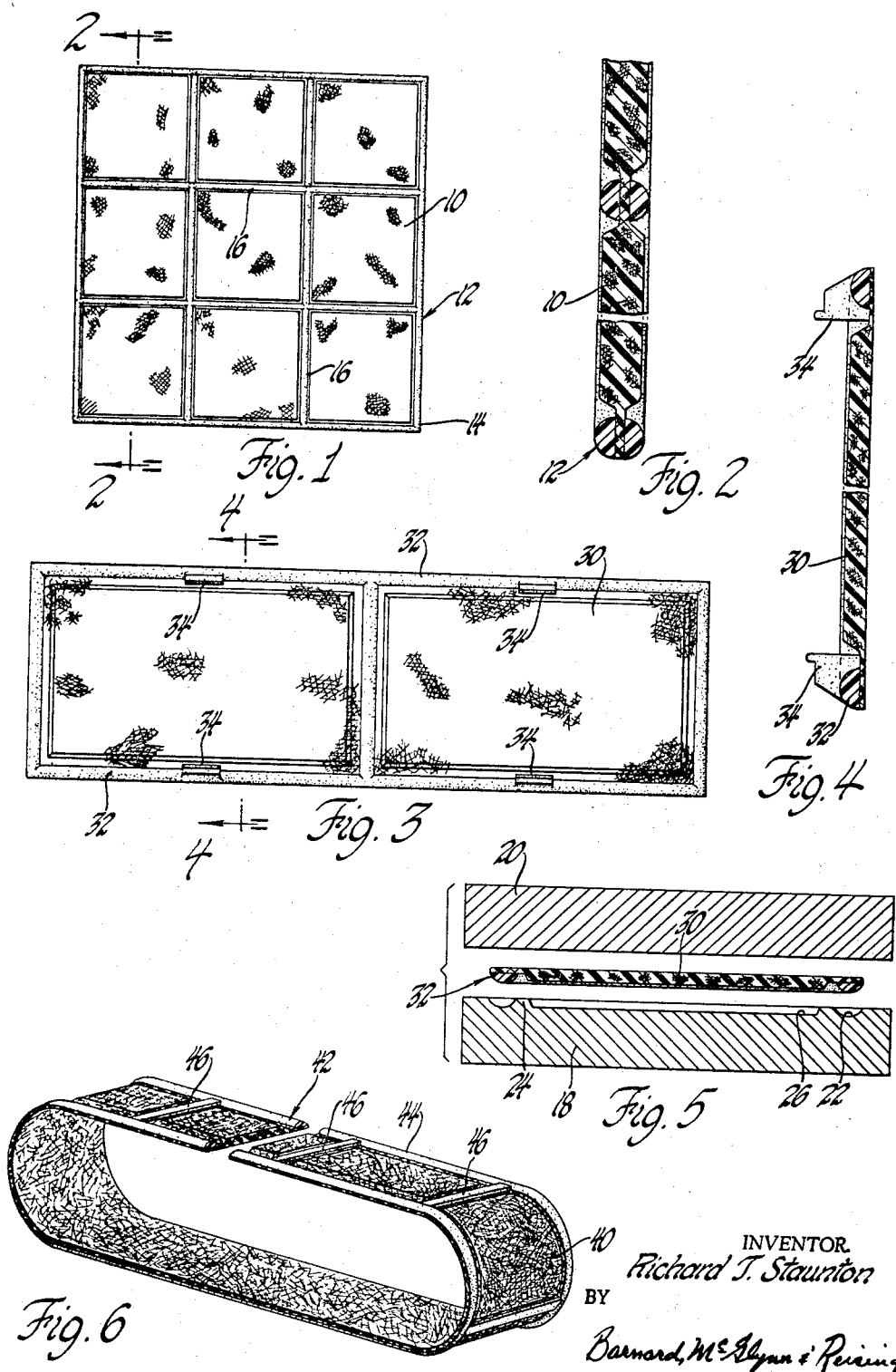
INVENTOR.
Richard T. Staunton
BY
Barnard, McGlynn & Reising
ATTORNEYS

United States Patent Office 3,408,438
Patented Oct. 29, 1968

3,408,438
METHOD OF MAKING SELF-SUPPORTING FILTER ELEMENT
Richard T. Staunton, Birmingham, Mich., assignor to G. S. Staunton & Co. Inc., Birmingham, Mich., a corporation of Michigan
Original application Feb. 5, 1964, Ser. No. 342,599. Divided and this application June 14, 1966, Ser. No. 557,560
7 Claims. (Cl. 264—252)

This invention relates to filter elements and more particularly to a method of manufacturing a self-supporting filter element wherein the filter means is of a material which is flexible and nonself-supporting. This application is a divisional application of the copending United States application, Ser. No. 342,599 filed on Feb. 5, 1964, now abandoned, in the name of Richard T. Staunton.

In the design and manufacture of filter elements, such as of the type that might be used for air conditioning units, furnaces or the like, the increasing popularity of plastic foam materials for the filter element presents numerous problems. Theoretically, the filter element need only be thick enough to give the desire amount of filtration to the air passing therethrough. However, such foam materials are usually of such a flexible nature that they do not support themselves in the apparatus with which they are used when manufactured to the desired dimensions. When the filter elements become dirty and need to be cleaned or replaced, it is highly desirable that they be of such construction that they are easily removed. Since the filter element is not self-supporting, elaborate fastening means are required to secure it in its filtering position in the apparatus, making it that much more difficult for removal and/or replacement. In order to overcome this problem, either the filter material must be made of such thickness and density to be self-supporting, which inordinately increases the overall expense even though the overall air restriction efficiency of the unit is increased, or else some elaborate means must be taken to support the filter material and provide a suitable frame structure. Such means, however, have in the past been extremely expensive and inefficient, both from the manufacture and the design standpoint.

It is here proposed to provide a method for manufacturing a filter element where the filter material is of optimum density and thickness, even though it is flexible and nonself-supporting. The method comprises, generally, the steps of placing a batt of such filter material in a suitable mold or die and overlying a series of cavities formed in a continuous and predetermined pattern, such as about the periphery of the filter batt. A thermosetting or thermoplastic material is injected into the mold or die and into the continuous cavities, the material incorporating the material of the filter batt overlying the cavities, and when the plastic material is cured, the resulting structure is of sufficient strength and rigidity to support the flexible filter batt and provide a supporting frame suitable for fitting into the apparatus with which the filter element is used.

It is apparent that a filter element constructed by the proposed method is extremely versatile in its design and manufacture possibilities. The size and shape of the filter element produced are limited only to the size and complexity permissible in the die or mold, and convenient fastening means may be formed integrally with the frame structure to eliminate the necessity of elaborate and expensive separable fastening devices that might otherwise be required. The filter element makes use of materials which are suited to the use to which the element is to be put, such as, for example, a flat filter element that may be slipped into place in a furnace or air conditioning device, or a continuous belt of filter material that might be used in a dehumidifier or the like, the frame structure being of sufficient flexibility in the latter case to permit the filter element to be formed into a continuous loop similar to a belt or chain. The overall result is a filter element of extreme versatility, relatively inexpensive to manufacture and produce on a volume basis, and of optimum efficiency in its operation.

These and other advantages will become more apparent from the following description in which:

FIGURE 1 is a plan view of a filter element manufactured in accordance with the invention.

FIGURE 2 is a partial cross-sectional view of the filter element illustrated in FIGURE 1, taken substantially along the line 2—2 of FIGURE 1 and looking in the direction of the arrows, to illustrate the structure of the filter element.

FIGURE 3 is a plan view of another filter element manufactured in accordance with the invention.

FIGURE 4 is a cross-sectional view of the filter element illustrated in FIGURE 3, taken substantially along the line 4—4 of FIGURE 3 and looking in the direction of the arrows.

FIGURE 5 is a diagrammatic illustration of the apparatus by which the filter elements of FIGURES 1 and 3 may be manufactured, utilizing the method of the invention.

FIGURE 6 is a perspective view of yet another filter element embodying the method of the invention.

Referring more particularly to the drawing, FIGURE 1 illustrates one type of filter element formed by the method embodying the invention and which may be of the type used in furnaces or the like. The element includes a batt of filter material 10 which is of substantially the overall size and shape of the completed element. The filter batt 10 may be formed of a plastic foam material which, in its optimum condition, is of flexible and noneself-supporting nature. That is, the filter batt by itself could not be used without elaborate fastening means to hold it in place and would not stand by itself in the apparatus with which it is used. To provide a stiffening means for the filter batt 10, a framework, illustrated generally by the numeral 12, is provided, and the assembly is manufactured in a manner to be hereinafter more clearly described.

The supporting frame 12 is formed of a suitable thermoplastic or thermosetting plastic material which may be injection molded or extruded to its proper form, and when so formed, will incorporate the adjacent portions of the filter batt 10 and provide a unitary or integral unit of sufficient strength to be self-supporting.

In the embodiment illustrated in FIGURE 1, the supporting frame 12 includes a peripheral portion 14 and a series of cross members 16 forming a grid-like pattern over the filter batt 10. Since the filter material is incorporated directly into the frame structure 12, as will become hereinafter more apparent, each individual section, or group of sections, of the filter element will be a complete and separate element in itself. Thus, if a filter element is manufactured, such as illustrated in FIGURE 1, with the nine separate sections shown and it is desirable to utilize only the lower right-hand four sections, the remaining five sections may easily be removed.

The result is still a complete and self-supporting filter element of the size and shape of the four remaining sections. This permits the manufacture of a single size filter element which may be easily adapted to apparatus of different sizes as desired.

Referring now to FIGURE 5, the method by which the filter element is manufactured will now be described. FIGURE 5 illustrates diagrammatically a mold or die assembly, including a lower plate 18 and an upper plate 20. Lower plate 18 is provided with a continuous series of cavities 22 which form the supporting frame pattern and which may be of any desired, but predetermined, configuration. Adjacent the continuous cavities 22 are raised portions 24, and within the raised portions 24 are enlarged cavities 26. The upper plate 20 may be similarly formed, or may be flat as illustrated in FIGURE 5, depending upon the type of frame structure desired in the filter element.

When it is desired to form a filter element, the batt 10 of filter material is placed between the die plates 18 and 20 and overlying the cavities 22. When the filter batt 10 is properly positioned between the plates 18 and 20, the plates are pressed together under pressure so that the raised portions 24 of the lower plate 18 compress the filter material 10 against the upper plate, or against similar projections if such are provided in the upper plate to seal the cavities 22 and prevent flow of material past the projections 24. The enlarged cavities 26 prevent the mold or die plates 18 and 20 from compressing the main body of the filter material 10. When the two plates 18 and 20 are properly placed together and under the required pressure, the material forming the frame structure is injected into the cavities 22 in any well known manner, the material being heated and in a liquid form to flow evenly through the continuous cavities 22. The liquid plastic envelopes the portions of the foam material overlying the cavities 22. After the material is injected into the cavities, it is allowed to cure, at which point it will harden and have incorporated in it the portions of the filter batt 10 overlying the cavities 22. After the material is cured, it is removed from the mold or die and the resultant structure is sufficiently self-supporting to be used in the desired apparatus.

Referring now to FIGURES 3 and 4, another type of filter element is illustrated in which a filter batt 30 is surrounded by a suitable frame structure 32 and which has been formed in the manner above described. Additionally, in the element shown in FIGURES 3 and 4, projections 34 are provided at spaced points along the periphery of the supporting frame 32 to form suitable fastening devices for the apparatus into which the filter element is placed. Such apparatus may be an air conditioner or the like, and suitable spring clips or other cooperating fastening means engage the projections 34 in any well known manner to secure the filter element in place. It is apparent that any type of fastening means may be integrally formed with the supporting frame 32 in the mold or die in which it is manufactured. Similarly, the fastening devices or fastening means may be located anywhere on the supporting frame, it being only necessary that they correspond with the location of the cooperating fastening means on the apparatus.

Referring now to FIGURES 2 and 4, a difference in the structure of the frame is apparent. The filter element illustrated in FIGURE 2 is provided with a supporting frame 12 which extends outwardly from either surface of the filter batt 10. On the other hand, the filter element illustrated in FIGURE 2 has the supporting frame 32 extending from only one surface of the filter batt 30. The diagrammatic illustration of FIGURE 5, wherein the continuous cavity 22 is formed only in the lower plate 18, illustrates how the support structure 32 of the filter element of FIGURE 4 may be formed. If additional continuous cavities are placed in the upper plate 20, similar to those of the lower plate 18, a supporting frame structure such as found in FIGURE 2 would be formed. In either instance, the material of the filter batt is compressed adjacent the continuous cavities to prevent the flow of liquid plastic material from the cavities to the enlarged central cavities 26 and thus into the body of the filter batt. As the liquid plastic material hardens or cures, the foam filter material is incorporated therein and becomes an integral part therewith to form the self-supporting filter element structure.

In the foregoing, filter elements have been described which have sufficient strength to support themselves in a planar position. However, by proper selection of materials and by properly dimensioning the various parts, it is possible to have a self-supporting filter element which is also of sufficient flexibility to provide a belt of filter material for use in other types of apparatus.

Reference is now made to FIGURE 6 wherein an elongated batt of filter material 40 is provided with a supporting frame 42 in the manner previously described. The supporting frame 42 extends at least around the peripheral edges of the elongated filter batt 40 and is of sufficient flexibility to be formed into the belt shape and to be rotated within the apparatus in which it is used. Suitable cross frame members 46 between the peripheral sections 44, and properly spaced therealong, may be provided, if necessary and desirable, to support the filter batt 40.

In actual practice, it has been found that a filter element as above described may be constructed using a filter material of polyurethane diisocyanate ester, expanded to the desired density and properly dimensioned to provide the desired filtration characteristics. A supporting frame material of polypropylene has been effectively injected into a suitably shaped die to incorporate the overlying portions of the foam filter material and when cured has been of sufficient strength and rigidity to support the filter element. In the actual manufacture, it has been found that with the die plates held together under a pressure of approximately 11,000 pounds per square inch and with the polypropylene supporting frame material being injected into the mold parts at a temperature of from 200° to 300° Fahrenheit have been satisfactory to form the filter element above described. It is evident that other materials are equally suited to the manufacture of the filter elements as are other temperature ranges and other pressure ranges in the materials used.

Thus, a self-supporting filter element is provided which is extremely economical to manufacture and extremely efficient in its operation. The filter material may be of a flexible and nonself-supporting type, and by the method above described is easily and efficiently provided with a supporting frame structure which does not adversely affect the filtering characteristics and yet provides the necessary support. The method permits numerous possibilities in size, shape and ancillary parts of the filter element, making it possible to utilize the method for substantially any filter element construction that is desired.

Modifications and alterations of the filter elements and the method of manufacture will now become apparent to those having skill in the art after having had reference to the foregoing description and drawing. However, it is not intended to limit the scope of the invention by the foregoing, but by the scope of the appended claims in which:

The embodiments of the invention in which an exclusive property or privilege is claimed are defined as follows:

1. A method for forming a self-supporting filter element comprising the steps of:

placing a batt of flexible nonself-supporting material into a mold having cavities formed in a predetermined pattern therein, said batt being located to lie across all of said cavities;

injecting a thermoplastic material into said mold and in contact with and filling the interstices in the portions of said batt overlying said cavities;

and curing said thermoplastic material to provide a supporting frame for said filter element integral with said filter material and with said portions of said filter material underlying said frame being compressed to prevent air flow therepast.

2. The method of forming a self-supporting filter element set forth in claim 1 wherein said batt is compressed in said mold adjacent said cavities to seal said cavities and prevent said thermoplastic material from flowing therefrom.

3. The method of forming a self-supporting filter element set forth in claim 2 wherein said cavities are disposed around the peripheral edge of one surface of said batt.

4. The method of forming a self-supporting filter element set forth in claim 3 wherein additional cavities are located in said mold forming a grid-like pattern interconnecting said peripheral cavities.

5. The method of forming a self-supporting filter element set forth in claim 2 wherein said cavities are disposed only on one side of said filter batt when said batt is placed in said mold.

6. The method of forming a self-supporting filter element set forth in claim 2 wherein said cavities are disposed on both sides of said filter batt when said batt is placed in said mold.

7. The method of forming a self-supporting filter element set forth in claim 2 wherein said thermoplastic material is injected under conditions of heat and pressure into said mold.

References Cited

UNITED STATES PATENTS

| 2,291,545 | 7/1942 | Granz et al. | 264—257 X |
| 3,082,587 | 3/1963 | Brimberg. | |
| 3,150,220 | 9/1964 | Howell | 264—259 |

FOREIGN PATENTS 741,918  12/1955  Great Britain.

ROBERT F. WHITE, *Primary Examiner.*

T. J. CARVIS, *Assistant Examiner.*

Notice of Adverse Decision In Interference

In Interference No. 97,338 involving Patent No. 3,408,438, R. T. Staunton, METHOD OF MAKING SELF-SUPPORTING FILTER ELEMENT, final judgment adverse to the patentee was rendered Oct. 31, 1972, as to claims 1, 2, 3, 4, 5 and 7.

[*Official Gazette December 12, 1972.*]